(12) United States Patent
Okuno

(10) Patent No.: US 7,370,717 B2
(45) Date of Patent: May 13, 2008

(54) RADIATOR DEVICE FOR TWO-WHEELED MOTOR VEHICLE

(75) Inventor: Yoshihisa Okuno, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 273 days.

(21) Appl. No.: 10/512,083

(22) PCT Filed: May 6, 2003

(86) PCT No.: PCT/JP03/05664

§ 371 (c)(1),
(2), (4) Date: Jan. 10, 2006

(87) PCT Pub. No.: WO03/095293

PCT Pub. Date: Nov. 20, 2003

(65) Prior Publication Data

US 2006/0102400 A1  May 18, 2006

(30) Foreign Application Priority Data

May 9, 2002  (JP) ............................. 2002-133959

(51) Int. Cl.
*B60K 11/04* (2006.01)
(52) U.S. Cl. ....................... 180/68.4; 180/219; 180/229
(58) Field of Classification Search ................ 180/219, 180/220, 229, 68.4, 68.6
See application file for complete search history.

(56) References Cited

U.S. PATENT DOCUMENTS

| 3,938,586 | A | * | 2/1976 | Barlow et al. ................ 165/51 |
| 4,171,729 | A | * | 10/1979 | Shibata ........................ 180/229 |
| 4,287,961 | A | * | 9/1981 | Steiger ....................... 180/68.4 |
| 4,641,721 | A | * | 2/1987 | Yamaguchi .................. 180/229 |
| 5,782,313 | A | * | 7/1998 | Kurawaki et al. .......... 180/219 |
| 6,591,934 | B2 | * | 7/2003 | Tsutsumikoshi ............ 180/291 |
| 6,966,355 | B2 | * | 11/2005 | Branham et al. ............. 165/41 |
| 7,089,994 | B2 | * | 8/2006 | Esposito et al. .............. 165/42 |
| 7,128,178 | B1 | * | 10/2006 | Heinle et al. .............. 180/68.4 |

FOREIGN PATENT DOCUMENTS

| JP | 58-43516 | 3/1983 |
| JP | 59-20729 | 2/1984 |
| JP | 3-120284 | 12/1991 |
| JP | 2001-130467 | 5/2001 |

* cited by examiner

*Primary Examiner*—Christopher P. Ellis
*Assistant Examiner*—Brian L. Swenson
(74) *Attorney, Agent, or Firm*—Oblon, Spivak, McClelland, Maier & Neustadt, P.C.

(57) ABSTRACT

In a motorcycle provided with a water-cooling type engine mounted to a lower portion of a motorcycle body, a radiator unit is arranged in front of the engine. The radiator unit is disposed so as to cover the front wheel and a cylinder head of the cylinder assembly from a front side thereof and is connected to the engine through a hose, the radiator unit has a vertically rectangular shape in an elevational section and is mounted to the motorcycle body through a rotational shaft extending vertically on lateral one side of the radiator unit in a traveling direction of the motorcycle, so that another one side one thereof is swung forward around the rotational shaft.

5 Claims, 4 Drawing Sheets

RADIATOR DEVICE FOR TWO-WHEELED MOTOR VEHICLE

TECHNICAL FIELD

The present invention relates a radiator or radiator unit of a motorcycle.

BACKGROUND ART

For example, generally, a scooter-type motorcycle has a specific structure such that an entire structure of a vehicle body of the motorcycle is covered by a body cover, a body portion between a handle and a front portion of a rider's seat is downwardly bent largely in almost U-shape to form a foot moving space in a width direction of the vehicle body of the motorcycle, and a low-floor type foot step on which rider's foot are rested is formed to the bottom of this U-shaped bent portion on each lateral side.

In the case of a scooter-type motorcycle having a small size, its engine is generally arranged below a rider's seat, but in the case of a scooter-type motorcycle having a medium or large size, it is necessary to mount a large-sized power unit including an engine, and for this reason, the engine is generally disposed below a foot-step.

On the other hand, in accordance with a requirement for mounting a large-sized engine, many vehicles and motorcycles have been equipped with water-cooling (-cooled) engines in order to achieve stable cooling performance and noise reducing performance. In addition, a radiator or radiator unit for cooling a cooling water is arranged directly behind a front wheel of the motorcycle to maximally utilize a traveling wind.

However, in the arrangement in which the engine is disposed below the foot-step and the radiator unit is disposed directly behind the front wheel, a head portion of the engine takes a position near the radiator unit. Thus, it becomes difficult to carry out, for example, maintenance working such as exchanging of an ignition plug of a cylinder head in a working space behind the radiator unit.

The present invention was conceived in consideration of the circumstances mentioned above, and an object of the present invention is to provide a radiator unit of a motorcycle capable of providing a working space behind the radiator unit for easily performing maintenance working in the space.

DISCLOSURE OF THE INVENTION

In order to achieve the above object, the present invention provides a radiator unit of a motorcycle, in which a water-cooling type engine is mounted to a lower portion of a motorcycle body between a handle bar for laterally steering a front wheel and a rider's seat, the engine having a cylinder assembly having a substantially horizontal axis and a front portion inclining obliquely upward in a forward direction, a radiator unit is arranged in front of the engine, and a transmission unit is disposed at a rear portion of the engine and below the rider's seat. In this arrangement, the radiator unit is disposed so as to cover the front wheel of the motorcycle and a cylinder head of the cylinder assembly from a front side thereof and is connected to the engine through a hose, the radiator unit has a vertically rectangular shape in an elevational section and is mounted to the motorcycle body through a rotational shaft extending vertically on lateral one side of the radiator unit in a traveling direction of the motorcycle, so that another one side one thereof is swung (pivotal) forward around the rotational shaft.

In a preferred embodiment of the present invention also to achieve the above object, the radiator unit includes a radiator core portion and a pair of cooling water tanks disposed at vertical upper and lower portions of the radiator core portion, the hoses extending towards the engine are connected to the cooling water tanks on the side of the radiator unit at which the rotational shaft is disposed.

Furthermore, there may take a structure in which a portion between the handle bar and the front portion of the rider's seat is largely bent downward in almost U-shape to produce a foot moving space extending in the width direction of the motorcycle body, and low floor type foot steps on which the rider's feet are rested are formed to lateral bottom portions of the U-shaped space, a floor tunnel is formed at a lateral central portion of the rider's foot steps so as to extend in the longitudinal direction of the motorcycle body and protrude upward, and the engine and the radiator unit are disposed inside the floor tunnel.

Still furthermore, it may be desired that the radiator unit has a lower portion extending below the cylinder assembly and a cooling fan is disposed in a space surrounded by a rear surface of the extending portion and a front lower surface of the cylinder assembly so that a lower portion of the space is opened downward.

In a modified aspect of the present invention, there is provided a radiator unit of a motorcycle, in which a water-cooling type engine is mounted to a lower portion of a motorcycle body between a handle bar for laterally steering a front wheel and a rider's seat, the engine having a cylinder assembly having a substantially horizontal axis and a front portion inclining obliquely upward in a forward direction, a radiator unit is arranged in front of the engine, and a transmission unit is disposed at a rear portion of the engine and below the rider's seat, the radiator unit comprising:

a radiator core portion having a vertically rectangular shape in an elevational section;

a pair of cooling water tanks arranged on vertically upper and lower portions of the radiator core portion; and a cooling water feed hose and a cooling water return hose, both being connected to the cooling water tanks, respectively, wherein the radiator unit is disposed so as to cover the front wheel and a cylinder head of the cylinder assembly from a front side thereof and is mounted to the motorcycle body through a rotational shaft extending vertically on lateral one side of the radiator unit in a traveling direction of the motorcycle, so that another one side one thereof is swung (pivotal) forward around the rotational shaft.

As mentioned above, according to the radiator unit of the motorcycle of the present invention, the radiator unit can be swingable, i.e., pivotal, around lateral one side thereof, so that the workability about the cylinder head can be improved. In addition, the connection hoses can be prevented from being loosen at their connecting portions.

Moreover, since hot wind passing the radiator core portion is guided downward along the front lower surface of the cylinder assembly, the hot wind does not stay in the floor tunnel, thus being convenient.

BEST MODE FOR EMBODYING THE INVENTION

Hereunder, an embodiment of the present invention will be described with reference to the accompanying drawings.

Figure 1:
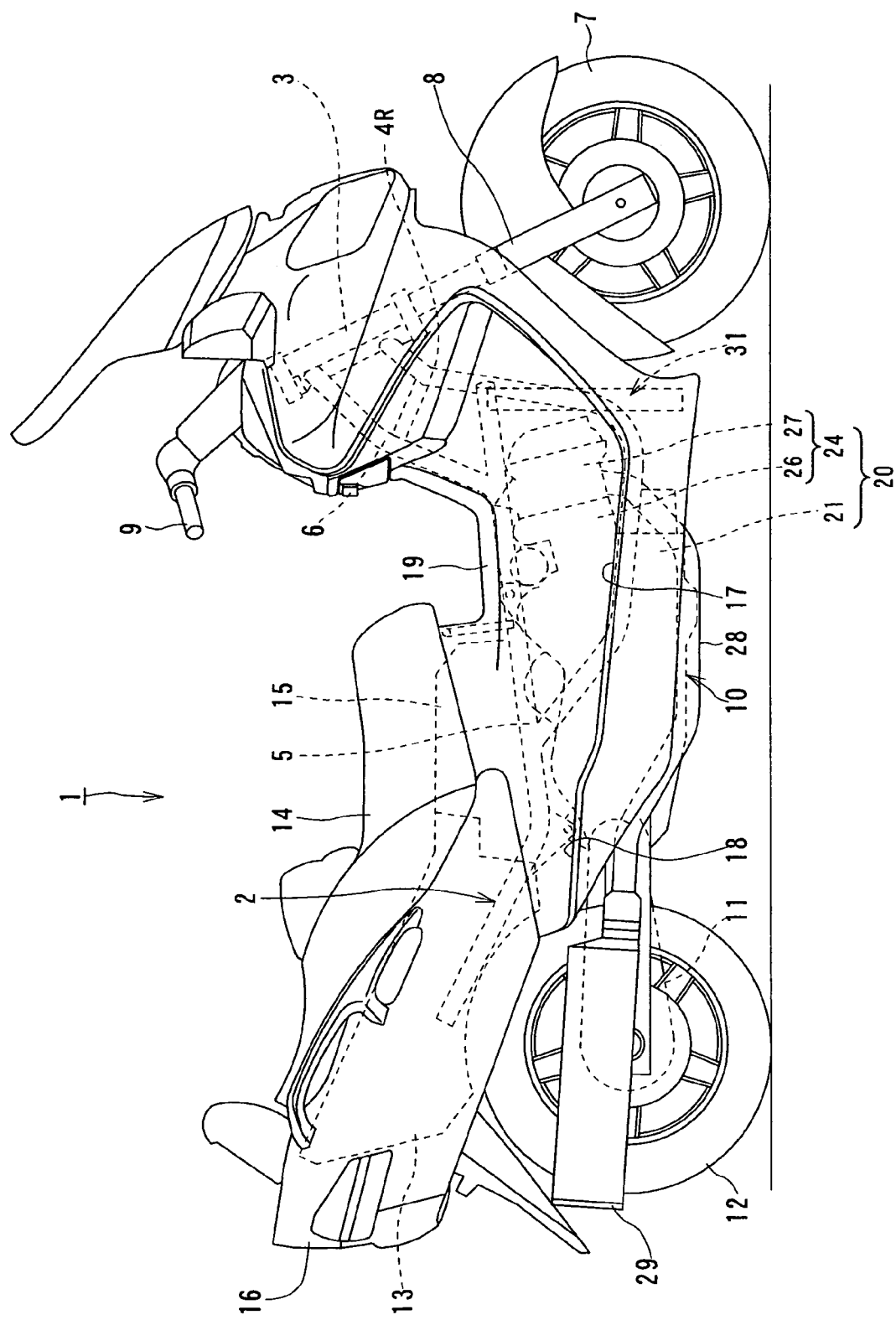
FIG. 1 is a right-side view of a scooter-type motorcycle to which one embodiment of a radiator unit of a motorcycle according to the present invention is applied.

FIG. 1 is a right-side view of one example of a scooter-type motorcycle to which the present invention is applied, and as shown in FIG. 1, a motorcycle 1 has a body frame 2 and a head pipe 3 attached to a front end of the body frame 2.

A pair of lateral, i.e., right and left, lower down-tubes 4R and 4L extend, from the lower portion of the head pipe 3, downward in a laterally expanding fashion and then extending rearward in a bent fashion so as to extend obliquely upward. A pair of lateral, i.e., right and left, main tubes 5 extend slightly obliquely rearward downward from a horizontal state from intermediate portions of the lower down-tubes 4R and 4L extending downward, and end portions of the lower down-tubes 4R and 4L are connected to intermediate portions of the main tubes 5. Furthermore, a pair of lateral, i.e., right and left, upper down-tubes 6 extend obliquely rearward downward, from the upper portion of the head pipe 3, in a laterally expanding fashion, and the end portions of the upper down-tubes 6 are also connected to intermediate portions of the main tubes 5.

Further, a front fork 8 and a handle bar 9, supporting the front wheel 7 to be rotatable, are connected to the head pipe 3, so that the front wheel 7 is steered pivotally in a lateral direction of the motorcycle body by means of handle bar 9.

A power unit 10 is mounted to a central lower portion of the body frame 2, and a power transmission 11 is arranged on the rear side of the power unit 10 in a manner that the front portion of the power transmission 11 is pivotal to the rear portion of the power unit 10. The power transmission 11 serves also as a suspension of a swing-arm structure for suspending a rear wheel and is supported to the motorcycle body to be swingable by means of shock absorber, not shown. The rear wheel 12, as a driving wheel, is supported by the rear end portion of this power transmission 11.

An article accommodation case 13 as an accommodation container for accommodating a helmet, articles, tools or like is arranged on the upper side of the rear wheel 12. Furthermore, a rider's seat 14 is disposed above the article accommodation case 13 to be opened or closed, the rider's seat 14 thus serving as a lid for the accommodation case 13. A fuel tank 15 is also disposed between the front lower portion of the rider's seat 14 and the rear upper portion of the power unit 10. The body frame 2 is covered by a body cover 16 formed as, for example, a synthetic resin product.

The body frame 2 and the body cover 16 between the handle 9 and the front portion of the rider's seat 14 are largely bent downward in almost U-shape to produce a foot moving space extending in the width direction of the motorcycle body, and foot-steps or floors on which the rider's feet are rested are formed to the lateral bottom portions of this U-shaped space, that is, a lower portion between the main tubes 5 and the lower down-tubes 4R and 4L of the body frame 2. In addition, pillion's foot-steps 18 is formed to the rear portion of the rider's foot-steps 17, and a floor tunnel 19 is formed at a lateral central portion of the rider's foot steps 17 so as to extend in the longitudinal direction of the motorcycle body and protrude upward.

Figure 2:
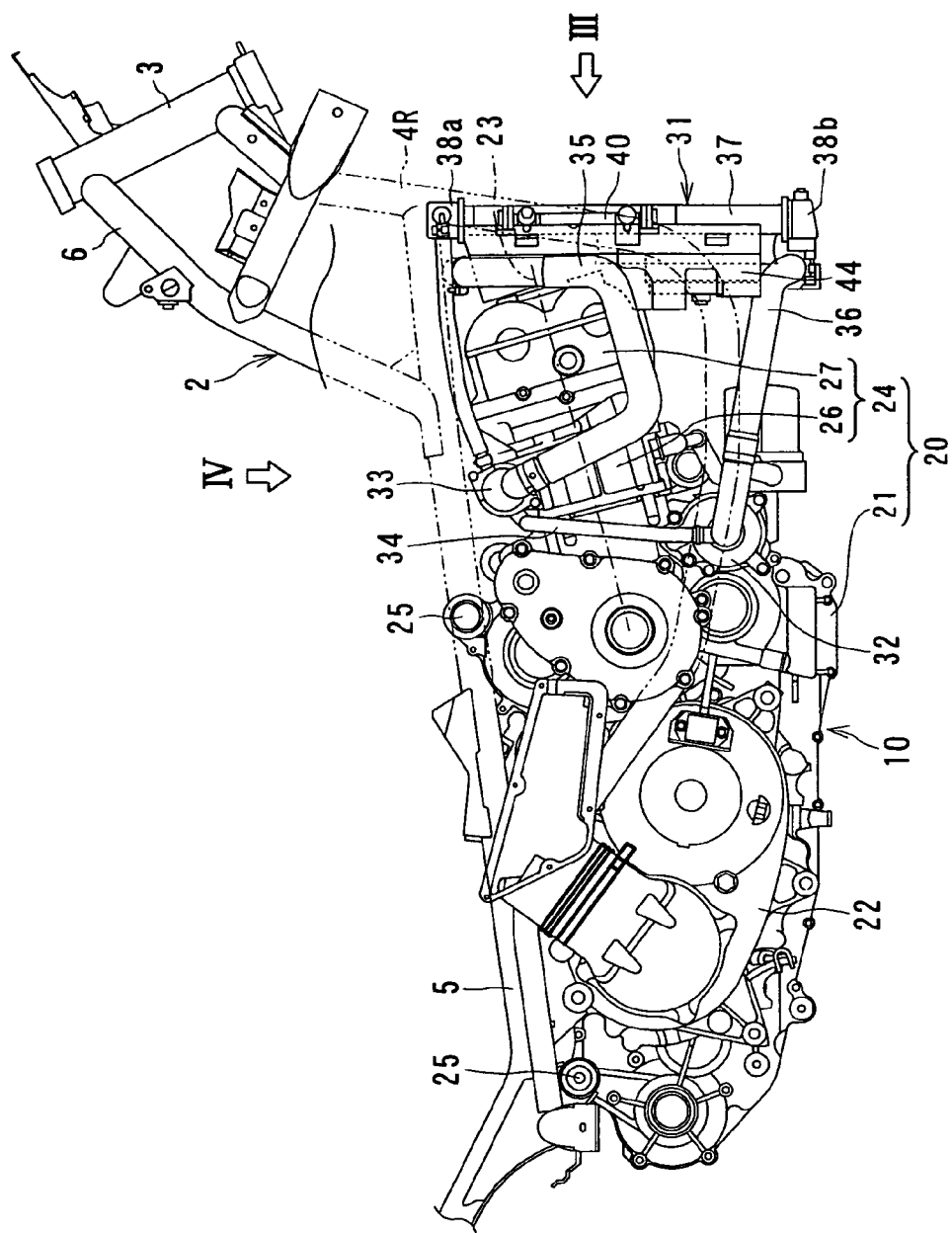
FIG. 2 is a right-side view, in an enlarged scale, of a power unit of the motorcycle shown in FIG. 1.
Figure 3:
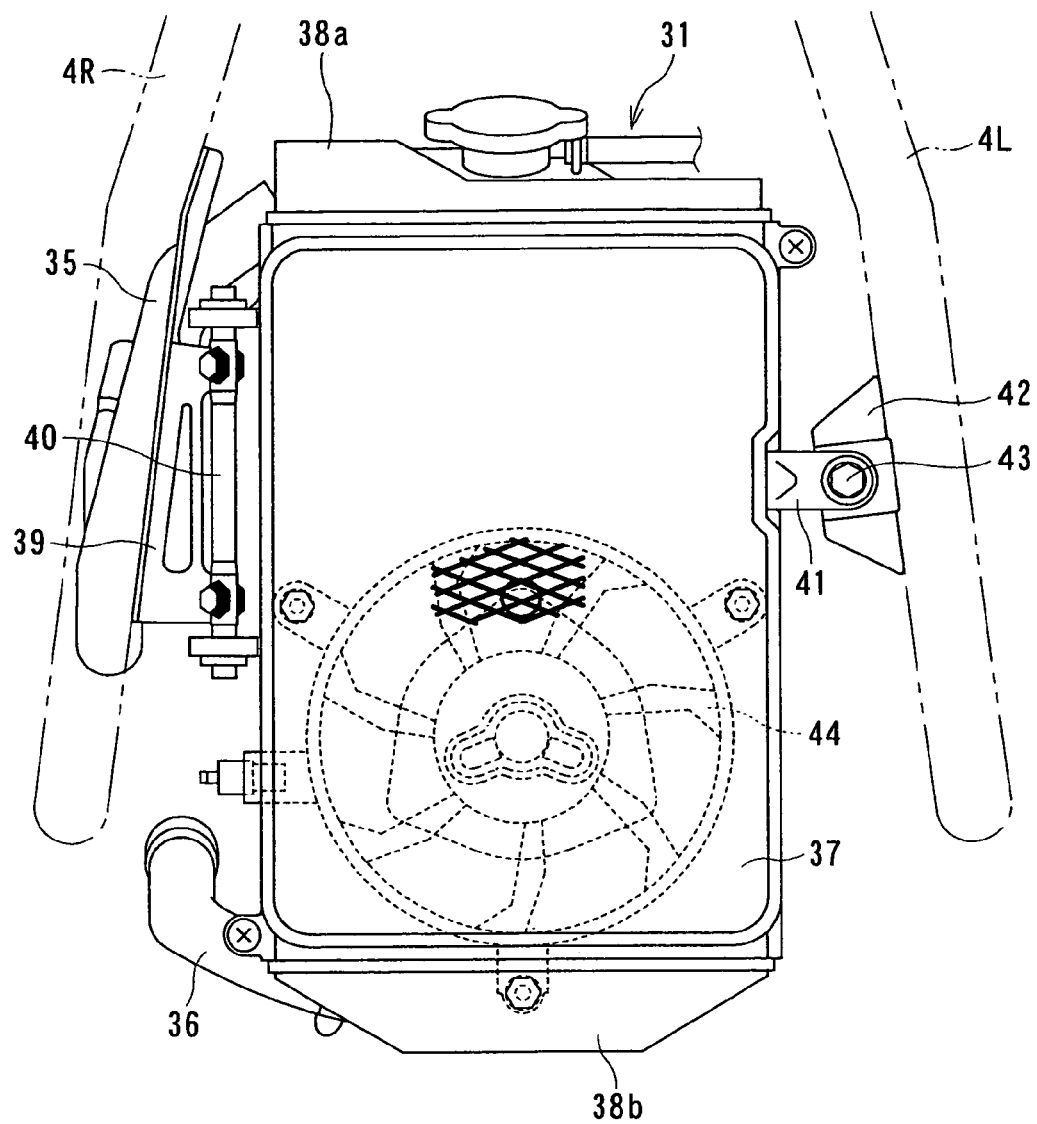
FIG. 3 is a view shown from a direction of an arrow III in FIG. 2.
Figure 4:
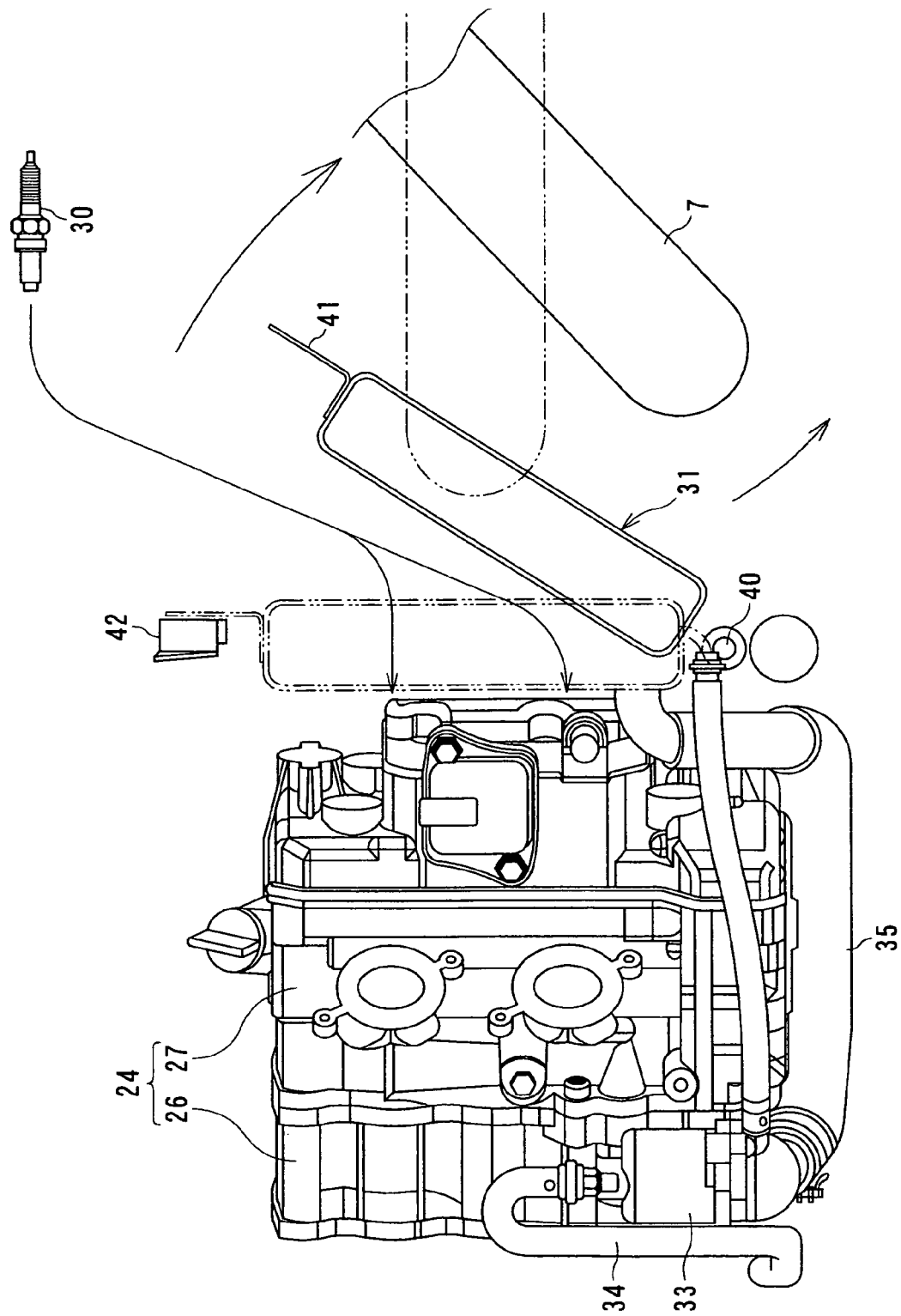
FIG. 4 is a view shown form a direction of an arrow IV in FIG. 2.

FIG. 2 is a right-side view of the power unit 10 in an enlarged scale. FIG. 3 is a view from the arrow III in FIG. 2, and FIG. 4 is a view from the arrow IV in FIG. 2.

As shown in FIGS. 1 to 4, the power unit 10 is composed of an engine 20 as a power generation section, a clutch mechanism, not shown, a crank case 21 incorporated therein with a transmission, not shown, and a transmission case 22, in which a V-belt type auto-transmission unit, not shown, is disposed.

The engine 20 is mainly composed of a front half portion of the crank case 21 and a cylinder assembly 24 which has a substantially horizontal axial line 23 at the front portion of the crank case 21 and inclines, at its front portion, forward obliquely upward. The power unit 10 is mounted firmly to the body frame 2 by means of engine mounting members 25 at plural portions. The engine 20 is disposed inside the floor tunnel 19 mentioned hereinbefore, and the transmission case 22 is arranged on the rear side of the engine 20 and below the fuel tank 15 disposed below the rider's seat 14.

The cylinder assembly 24 is composed of a cylinder block 26 disposed in front of the crank case 21 and a cylinder head 27 disposed on the front side of this cylinder block 26. A suction (intake) tube, not shown, is connected to the upper portion of the cylinder head 27, and on the other hand, as shown in FIG. 1, an exhaust tube 28 is connected, at its base end, to the lower portion of the cylinder head 27, and the exhaust tube 28 extends downward rearward to the lower portion of the power unit 10 so that the downstream side end of the exhaust tube 28 is connected to a muffler 29. A spark (ignition) plug 30 is screwed and fastened to the cylinder head 27 from the external front side thereof.

The engine 20 is a water-cooling (-cooled) type engine mounted to the motorcycle 1 shown in FIG. 1 and provided with a radiator unit 31 for cooling a water used for cooling the engine 20. The radiator unit 31 is arranged inside the body cover 16 between the front wheel 7 and the engine 20, and more specifically, inside the floor tunnel 19, as like as engine 20, so as to cover the cylinder head 27 of the cylinder assembly 24 from the front side thereof.

A water pump 32 is disposed a front lower portion of the crank case 21 on the right side thereof. This water pump 32 is driven by a crank shaft, not shown, to thereby feed the cooling water under pressure.

A cooling water passage, not shown, is formed so as to extend in the crank case 21 from the water pump 32 towards a mating portion to the cylinder block 26. The cooling water flows under pressure into a water jacket, not shown, formed around a cylinder, not shown, in the cylinder block 26 and into a water jacket, also not shown, formed around a combustion chamber in the cylinder head, thus cooling the various elements constituting the engine 20.

A thermostat 33 as a temperature sensing valve is disposed above the cylinder block 26 and the cooling water cooling the respective elements or parts of the engine 20 is guided to the this thermostat 33, which is hence designed to be opened at a time when the temperature of the cooling water reaches to a predetermined value. Furthermore, a cooling water bypass hose 34 is connected to the downstream side of the thermostat 33 so as to extend towards the water pump 32 and a cooling water feed hose 35 is also connected to the downstream side thereof so as to extend towards the radiator unit 31.

That is, the cooling water introduced into the thermostat 33, after cooling the engine 20, is guided to the cooling water bypass hose 34 till the time when the temperature of the cooling water at the cooling period of the engine 20 has reached a predetermined value and again guided into the cylinder block 26 and the cylinder head 27. On the other hand, at the time of a warming-up period of the engine 20, when the cooling water temperature has reached the predetermined value, the thermostat 33 is opened and the cooling water is guided to the radiator unit 31 through the cooling water feed hose 35. The cooling water guided to the radiator unit 31 is returned, after cooling the radiator unit 31, to the water pump 32 through a cooling water return hose 36.

The radiator unit 31 is, as shown in FIG. 3, has a vertically rectangular shape, in an elevational section, i.e., in a front view, having a side length longer than a length of an upper surface thereof, and is disposed between the lateral down-tubes 4R and 4L. The radiator unit 31 comprises a radiator core portion 37 and a pair of vertical cooling water tanks 38a and 38b arranged on upper and lower portions of the radiator core portion 37. The cooling water feed hose 35 extending from the thermostat 33 is connected to the upper side cooling water tank 38a, and on the other hand, the cooling water return hose 36 extending towards the water pump 32 is connected to the lower side cooling water tank 38b, respectively.

The radiator unit 31 is mounted to the body frame 2 in the following manner. The lateral one side, i.e., the right side portion (left side portion as viewed on FIG. 3) in the motorcycle traveling direction, is mounted to the body frame 2 to be swingable. In this embodiment, the right side portion is mounted to a pivotal bracket 39 provided for the right-side lower down-tube 4R to be swingable, i.e., pivotal, through a rotational shaft 40 extending in the vertical direction in a manner that, as shown in FIG. 4, the other one side, i.e., left side portion (upper side as viewed on FIG. 4) in this embodiment in the motorcycle traveling direction is swingable forward (right side as viewed in FIG. 4).

On the other hand, a mounting piece 41 is attached to the lateral other side of the radiator unit 31 so that the mounting piece 41 is mounted, to be detachable by means of bolt 43, for example, to a mounting bracket 42 attached to the left-side lower down-tube 4L.

Furthermore, the cooling water feed hose 35 and the cooling water return hose 36 are connected to the side of the cooling water tanks 38a and 38b, i.e., right side in the motorcycle traveling direction in this embodiment, on which the rotational shaft 40 of the radiator unit 31 is arranged.

On the other hand, as shown in FIG. 2, the radiator unit 31 has a lower portion which extends downward over the cylinder assembly 24 of the engine 20. A cooling fan 44 of, for example, electrically driven type is disposed in a space surrounded by the rear surface of this extending portion and the front lower surface of the cylinder assembly 24 and is opened at its lower portion. This cooling fan 44 is for forcibly guiding cooling air to the radiator core portion 37 (in a case, for example, that it is difficult to obtain sufficient amount of wind at the motorcycle traveling time).

The radiator unit 31 of the motorcycle according to the present invention of the structure mentioned above will be operated as follows.

Since the radiator unit 31 is mounted to be swingable to the body frame 2, workings around the cylinder head 27 including the attachment or detachment of the spark plug 30 can be easily done without entirely disassembling the radiator unit and hoses or like.

Furthermore, in the example in which the radiator unit 31 is constructed so as to provide a vertically rectangular shape and the rotational shaft 40 is disposed on one of lateral sides having long length to be pivotal, the rotational (pivotal) angle of the radiator unit 31 can be made large, in comparison with the case that the rotational shaft 40 is disposed on the short length side of a radiator unit having a horizontally rectangular shape, even with the same distance between the radiator unit 31 and the front wheel 7, so that the workability around the cylinder head 27 can be improved, thus being advantageous.

In addition, in the example of the pivotal arrangement of the rotational shaft 40 shown in FIG. 4, the distance between the radiator unit 31 and the front wheel 7 can be widened at the steering operation of the front wheel in the one side direction, and hence, the rotational angle of the radiator unit 31 is made further large, so that the working efficiency or workability around the cylinder head 27 can be remarkably improved.

Still furthermore, in the arrangement of the present invention, since the cooling water feed hose 35 and the cooling water return hose 36 are connected to the cooling water tank 38a and the cooling water tank 38b, respectively, on the side on which the rotational shaft 40 of the radiator unit 31 is disposed, these hoses 35 and 36 are not pulled so much, even in a time when the radiator unit 31 is swung or pivoted, thus eliminating necessity for using long hoses and preventing these hoses 35 and 36 from being relaxed at the connected portions, thus also being advantageous.

Still furthermore, the space between the handle bar 9 and the front portion of the rider's seat 14 is formed so as to provide a U-shaped curve portion to form a foot moving space in the width direction of the motorcycle body, and the low floor type rider's foot-step 17 is formed to each of the lateral sides of the foot moving space. The floor tunnel 19 is also formed so as to be protrude upward at the lateral central portion of the foot-steps 17, and inside this floor tunnel 19, the engine 20 and the radiator unit 31 can be arranged. According to such structure and arrangement, the cooling efficiency of the radiator unit 31 can be ensured without deteriorating the maneuverability of the engine even if the width of the foot-step 17 is widened and the width of the floor tunnel 19 is hence reduced.

Still furthermore, the cooling fan 44 is arranged in the space surrounded by the rear surface of the lower extension of the radiator unit 31 and the front lower surface of the cylinder assembly 24. According to this arrangement, since the hot air flown through the radiator core portion by the operation of the cooling fan 44 can be guided downward along the front lower surface of the cylinder assembly 24, the hot air does not stay in the space of the floor tunnel 19, thus being convenient.

It is to be noted that the present invention is not limited to the described embodiment and many other changes and modifications may be made without departing from the scopes of the appended claims. For example, in the described embodiment, the present invention is disclosed in relation to a scooter-type motorcycle, but the present invention is of course applicable to other type motorcycle.

INDUSTRIAL APPLICABILITY

In the motorcycle provided with the radiator unit according to the present invention, the radiator unit is arranged to be swingable, so that the workability around the cylinder head can be improved and the connection member such as hoses can be substantially prevented from being relaxed at the connection portion. In addition, since the hot air caused by the operation of the cooling fan and passing through the radiator core portion 37 can be guided downward along the front lower surface of the cylinder assembly, the hot air does not stay in the space of the floor tunnel, thus being advantageous. The motorcycle provided with such radiator unit can provide a valuable industrial applicability.

The invention claimed is:

1. A radiator unit of a motorcycle, in which a water-cooling type engine is mounted to a lower portion of a motorcycle body between a handle bar for laterally steering a front wheel and a rider's seat, said engine having a cylinder assembly having a substantially horizontal axis and a front portion inclining obliquely upward in a forward direction, a radiator unit is arranged in front of the engine, and a transmission unit is disposed at a rear portion of the engine and below the rider's seat, wherein said radiator unit is disposed so as to cover the front wheel and a cylinder head of the cylinder assembly from a front side thereof and is connected to the engine through a hose, the radiator unit has a vertically rectangular shape in an elevational section and is mounted to the motorcycle body through a rotational shaft extending vertically on lateral one side of the radiator unit in a traveling direction of the motorcycle, so that another one side one thereof is swung forward around the rotational shaft.

2. A radiator unit of a motorcycle according to claim 1, wherein said radiator unit includes a radiator core portion and a pair of cooling water tanks disposed at vertical upper and lower portions of the radiator core portion, hoses extending towards the engine are connected to the cooling water tanks on the side of the radiator unit at which the rotational shaft is disposed.

3. A radiator unit of a motorcycle according to claim 1, wherein a portion between the handle bar and the front portion of the rider's seat is largely bent downward in almost U-shape so as to provide a foot moving space extending in the width direction of the motorcycle body, and low floor type foot-steps on which the rider's feet are rested are formed to lateral bottom portions of the U-shaped space, a floor tunnel is formed at a lateral central portion of the rider's foot-steps so as to extend in the longitudinal direction of the motorcycle body and protrude upward, and the engine and the radiator unit are disposed inside the floor tunnel.

4. A radiator unit of a motorcycle according to claim 1, wherein the radiator unit has a lower portion extending below the cylinder assembly and a cooling fan is disposed in a space surrounded by a rear surface of the extending portion and a front lower surface of the cylinder assembly so that a lower portion of the space is opened downward.

5. A radiator unit of a motorcycle, in which a water-cooling type engine is mounted to a lower portion of a motorcycle body between a handle bar for laterally steering a front wheel of the motorcycle and a rider's seat, said engine having a cylinder assembly having a substantially horizontal axis and a front portion inclining obliquely upward in a forward direction, a radiator unit is arranged in front of the engine, and a transmission unit is disposed at a rear portion of the engine and below the rider's seat, said radiator unit comprising:
a radiator core portion having a vertically rectangular shape in an elevational section;
a pair of cooling water tanks arranged on vertically upper and lower portions of the radiator core portion; and
a cooling water feed hose and a cooling water return hose, both being connected to the cooling water tanks, respectively,
wherein said radiator unit is disposed so as to cover the front wheel and a cylinder head of the cylinder assembly from a front side thereof and is mounted to the motorcycle body through a rotational shaft extending vertically on lateral one side of the radiator unit in a traveling direction of the motorcycle, so that another one side one thereof is swung forward around the rotational shaft.

* * * * *